(12) United States Patent
Lin

(10) Patent No.: US 8,667,209 B2
(45) Date of Patent: Mar. 4, 2014

(54) NON-VOLATILE MEMORY ACCESS METHOD AND SYSTEM, AND NON-VOLATILE MEMORY CONTROLLER

(75) Inventor: Ming-Hui Lin, Pingtung County (TW)

(73) Assignee: Phison Electronics Corp., Miaoli (TW)

( * ) Notice: Subject to any disclaimer, the term of this patent is extended or adjusted under 35 U.S.C. 154(b) by 475 days.

(21) Appl. No.: 12/769,025

(22) Filed: Apr. 28, 2010

(65) Prior Publication Data

US 2011/0219172 A1 Sep. 8, 2011

(30) Foreign Application Priority Data

Mar. 4, 2010 (TW) .............................. 99106296 A

(51) Int. Cl.
*G06F 12/02* (2006.01)
(52) U.S. Cl.
USPC .......................... 711/103; 711/154; 711/165
(58) Field of Classification Search
USPC .......................... 711/103, 154, 165
See application file for complete search history.

(56) References Cited

U.S. PATENT DOCUMENTS

| | | | |
|---|---|---|---|
| 6,763,424 B2 * | 7/2004 | Conley | 711/103 |
| 6,938,116 B2 * | 8/2005 | Kim et al. | 711/103 |
| 6,968,421 B2 * | 11/2005 | Conley | 711/103 |
| 7,039,788 B1 * | 5/2006 | Chang et al. | 711/203 |
| 7,057,937 B1 * | 6/2006 | Matsubara et al. | 365/185.24 |
| 7,085,909 B2 * | 8/2006 | Ananthanarayanan et al. | 711/202 |
| 7,487,303 B2 * | 2/2009 | Song et al. | 711/154 |
| 7,525,870 B2 * | 4/2009 | Erez | 365/238.5 |
| 7,583,545 B2 * | 9/2009 | Lasser | 365/189.16 |
| 7,620,769 B2 * | 11/2009 | Lee et al. | 711/103 |
| 7,779,217 B2 * | 8/2010 | Erez | 711/157 |
| 7,835,193 B2 * | 11/2010 | Lee | 365/185.29 |
| 8,151,035 B2 * | 4/2012 | Smith et al. | 711/103 |
| 2010/0161885 A1 * | 6/2010 | Kanno et al. | 711/103 |

FOREIGN PATENT DOCUMENTS

| | | |
|---|---|---|
| CN | 1389790 | 1/2003 |
| CN | 101640069 | 2/2010 |
| TW | 200903492 | 1/2009 |

OTHER PUBLICATIONS

Kang, Jeong-Uk, et al. "A superblock-based flash translation layer for NAND flash memory." Proceedings of the 6th ACM & IEEE International conference on Embedded software. ACM, 2006.*
Lim, Seung-Ho, and Kyu-Ho Park. "An efficient NAND flash file system for flash memory storage." Computers, IEEE Transactions on 55.7 (2006): 906-912.*
"First Office Action of China counterpart application" issued on Apr. 9, 2013, p. 1-p. 11, in which the listed references were cited.

* cited by examiner

*Primary Examiner* — Sanjiv Shah
*Assistant Examiner* — Samuel Dillon
(74) *Attorney, Agent, or Firm* — J.C. Patents

(57) ABSTRACT

A non-volatile memory access method and system, and a non-volatile memory controller are provided for accessing a plurality of physical blocks in a non-volatile memory chip, and each physical block has a plurality of physical pages. The method includes determining whether there is enough space in a first physical block to write a plurality of specific physical pages when data stored in one of the specific physical pages are to be updated; and writing valid data and data to be updated into the first physical block when the first physical block has enough space to write the specific physical pages.

19 Claims, 9 Drawing Sheets

NON-VOLATILE MEMORY ACCESS METHOD AND SYSTEM, AND NON-VOLATILE MEMORY CONTROLLER

CROSS-REFERENCE TO RELATED APPLICATION

This application claims the priority benefit of Taiwan application serial no. 99106296, filed on Mar. 4, 2010. The entirety of the above-mentioned patent application is hereby incorporated by reference herein and made a part of this specification.

BACKGROUND OF THE INVENTION

1. Field of the Invention

The invention is related to a non-volatile memory access method, a non-volatile memory controller which uses the method, an a non-volatile memory access system.

2. Description of Related Art

Digital cameras, cells phones, and digital music players have undergone rapid growth in recent years, so that consumer demand for storage media have also rapid increased. Since flash memory has properties such as non-volatility of data, low power consumption, small volume, and having no mechanical structures, flash memory is suitable for portable usage, in particular for usage in the above-mentioned portable devices which are powered by batteries. Solid state drives (SSD) are a type of storage device that uses not and (NAND) non-volatile memory as a storage medium. Since non-volatile memories have small volume and large storage capacity, non-volatile memories have been widely used in the storage of important personal information. Hence, the non-volatile memory industry has become one of the popular industries in the whole electronic industry.

In the design of a non-volatile memory access device, each non-volatile memory chip has a plurality of physical blocks, and each of the physical blocks has a plurality of physical pages. A single physical block is the smallest erase unit of the non-volatile memory, and a single physical page is the smallest write unit of the non-volatile memory. Due to the fact that when a memory cell of the non-volatile memory is programmed, only unidirectional programming is executed (i.e. programming the value of the memory cell from 1 to 0), data cannot be directly written to a physical page that has been programmed. In other words, a physical page with data stored therein can only be reprogrammed after this physical page has been erased. Therefore, because a physical block is the smallest erase unit of the non-volatile memory, when a physical page which has existing data is to be erased, the whole physical block to which the physical page belongs must be erased.

Generally, a non-volatile memory controller of the non-volatile memory access device logically groups the physical blocks in the non-volatile memory chip into a system area, a data area, a spare area, or a replacement area. The physical blocks in the system area are used to store important information which are relevant to the non-volatile memory access device, and the physical blocks in the replacement area are used to replace the physical blocks in the data area or in the spare area which are damaged (i.e. damaged physical blocks). Hence, under normal accessing conditions, a host system is unable to access the physical blocks in the system area or in the replacement area. On the other hand, the physical blocks of the data area are used to store effective data written by a write command, and the physical blocks of the spare area are used to substitute the physical blocks of the data area when a write command is executed. Hence it can be known that when the host system gives a write command, the command is usually accompanied by merging of two physical blocks (i.e. the physical block in the data area and the physical block in the spare area), so that the purpose of updating data is achieved.

However, in some applications of non-volatile memory, in particular those of micro secure digital (SD) memory cards which have smart cards therein, the above mechanism for updating data may not be timely performed in a write command period as defined by the current micro SD memory card specification. Generally, it is clearly defined by micro SD memory card specification that the completion time for each write command must be within 250 milliseconds.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

The invention provides a non-volatile memory access method and system, and a non-volatile memory controller, so as to ensure the time needed to execute a write command does not exceed the time defined in a specification.

The invention provides a non-volatile memory access method, which is used to manage a plurality of physical blocks in a non-volatile memory chip. Each of the physical blocks includes a plurality of physical pages. The non-volatile memory access method includes the following steps. When data stored in one of a plurality of specific physical pages in a first physical block are to be updated, it is determined whether there is enough space in the first physical block to write the specific physical pages. When there is enough space in the first physical block to write the specific physical pages, valid data of the specific physical pages and data to be updated are written into the first physical block.

According to an embodiment of the invention, the non-volatile memory access method further includes the following steps. When there is not enough space in the first physical block to write the specific physical pages, an empty second physical block is selected among the physical blocks, and the effective data of the specific physical pages and the data to be updated are written to the second physical block.

According to an embodiment of the invention, the physical pages of each of the physical blocks include a plurality of fast physical pages and a plurality of slow physical pages, and the non-volatile memory access method further includes the following steps. The effective data of the specific physical pages and the data to be updated are written to some of the fast physical pages and to some of the slow physical pages in the first physical block or in the second physical block.

According to an embodiment of the invention, the non-volatile memory access method further includes the following steps. All of the physical blocks in the non-volatile memory chip are divided into a first memory area and a second memory area, wherein the first physical block and the second physical block belong to the first memory area.

According to an embodiment of the invention, the non-volatile memory access method further includes the following steps. A total time to move the specific physical pages of the first physical block and to then move all physical pages of a third physical block is made to be equal to or less than a specified time limit, wherein the third physical block belongs to the second memory area.

According to an embodiment of the invention, the specified time limit is defined by a specification.

According to an embodiment of the invention, the above specific physical pages are a data moving unit. A number of the specific physical pages is equal to or greater than two, and is less than a number of physical pages included in each of the physical blocks of the non-volatile memory chip.

The invention provides another non-volatile memory access method, which is used to access a plurality of physical blocks in a non-volatile memory chip. Each of the physical blocks has a plurality of physical pages, and the above physical pages include a plurality of fast physical pages and a plurality of slow physical pages. The non-volatile memory access method includes the following steps. When a host system attempts to write data to a first physical block, it is determined whether physical pages of a predetermined number in the first physical block have been fully written. When the predetermined number of physical pages have been fully written, a second physical block is selected to write the data. The physical pages of the predetermined number are at least two physical pages and include the fast physical pages and the slow physical pages. When the predetermined number of physical pages have been fully written, there are still some physical pages in the first physical block that have not been written data.

According to an embodiment of the invention, the non-volatile memory access method further includes the following steps. When the predetermined number of physical pages have not been fully written, it is determined whether there is enough space in the predetermined number of physical pages to write the data. If yes, the data is written to the first physical block. If no, the data is written to the second physical block.

According to an embodiment of the invention, the predetermined number is less than a number of physical pages included in each of the physical blocks of the non-volatile memory chip.

The invention also provides a non-volatile memory controller, disposed in a non-volatile memory access device which includes a non-volatile memory chip, wherein the non-volatile memory chip includes a plurality of physical blocks, and each of the physical blocks has a plurality of physical pages. The non-volatile memory controller includes a microprocessor unit, a non-volatile memory interface unit, a host interface unit, and a memory management unit. The non-volatile memory interface unit is coupled to the microprocessor unit, for coupling to the non-volatile memory chip. The host interface unit is coupled to the microprocessor unit, for coupling to a host system. The memory management unit is coupled to the microprocessor unit. When the host system attempts to update data stored in one of a plurality of specific physical pages in a first physical block among the physical blocks, the memory management unit determines whether there is enough space in the first physical block to write the specific physical pages. When there is enough space in the first physical block to write the specific physical pages, valid data of the specific physical pages and data to be updated are written into the first physical block.

According to an embodiment of the invention, when there is not enough space in the first physical block to write the specific physical pages, the memory management unit selects an empty second physical block among the physical blocks for writing the effective data of the specific physical pages and the data to be updated.

According to an embodiment of the invention, the physical pages include a plurality of fast physical pages and a plurality of slow physical pages, and effective data of the specific physical pages and data to be updated are written to some of the fast physical pages and to some of the slow physical pages in the first physical block or in the second physical block.

According to an embodiment of the invention, the physical blocks are divided into a first memory area and a second memory area, wherein the first physical block and the second physical block belong to the first memory area.

According to an embodiment of the invention, the memory management unit makes a total time to move the specific physical pages of the first physical block and to then move all physical pages in a third physical block equal to or less than a specified time limit, wherein the third physical block belongs to the second memory area.

According to an embodiment of the invention, the above specific physical pages are a data moving unit. A number of the specific physical pages is equal to or greater than two, and is less than a number of physical pages included in each of the physical blocks of the non-volatile memory chip.

The invention provides a non-volatile memory controller, disposed in a non-volatile memory access device which includes a non-volatile memory chip, wherein the non-volatile memory chip includes a plurality of physical blocks, and each of the physical blocks has a plurality of physical pages. The above physical pages include a plurality of fast physical pages and a plurality of slow physical pages. The non-volatile memory controller includes a microprocessor unit, a non-volatile memory interface unit, a host interface unit, and a memory management unit. The non-volatile memory interface unit is coupled to the microprocessor unit, for coupling to the non-volatile memory chip. The host interface unit is coupled to the microprocessor unit, for coupling to a host system. The memory management unit is coupled to the microprocessor unit. When the host system attempts to write data to a first physical block among the above physical blocks, the memory management unit determines whether physical pages of a predetermined number in the first physical block have been fully written. The physical pages of the predetermined number are at least two physical pages and include the fast physical pages and the slow physical pages. When the predetermined number of physical pages have been fully written, there are still some physical pages in the first physical block that have not been written data, and the memory management unit selects a second physical block for writing the data.

According to an embodiment of the invention, when the predetermined number of physical pages have not been fully written, the memory management unit determines whether there is enough space in the predetermined number of physical pages to write the data. If yes, the data is written to the first physical block, If no, the data is written to the second physical block.

According to an embodiment of the invention, the predetermined number is less than a number of physical pages included in each of the physical blocks of the non-volatile memory chip.

The invention further provides non-volatile memory access system, which includes a non-volatile memory chip, a connector, and a non-volatile memory controller. The non-volatile memory chip has a plurality of physical blocks, wherein each of the physical blocks has a plurality of physical pages. The connector is coupled to a host system. The non-volatile memory controller is coupled to the non-volatile memory chip and the connector, wherein when the host system attempts to update data stored in one of a plurality of specific physical pages in a first physical block among the physical blocks, the non-volatile memory controller determines whether there is enough space in the first physical block to write the specific physical pages. If yes, valid data of the specific physical pages and data to be updated are written into the first physical block.

According to an embodiment of the invention, when there is not enough space in the first physical block to write the specific physical pages, the non-volatile memory controller selects an empty second physical block among the physical blocks for writing the effective data of the specific physical pages and the data to be updated.

According to an embodiment of the invention, the physical pages include a plurality of fast physical pages and a plurality of slow physical pages, and the effective data of the specific physical pages and the data to be updated are written to some of the fast physical pages and to some of the slow physical pages in the first physical block or in the second physical block.

According to an embodiment of the invention, the physical blocks are divided into a first memory area and a second memory area, wherein the first physical block and the second physical block belong to the first memory area.

According to an embodiment of the invention, the non-volatile memory controller makes a total time to move the specific physical pages of the first physical block and to then move all physical pages in a third physical block equal to or less than a specified time limit, wherein the third physical block belongs to the second memory area.

According to an embodiment of the invention, the above specific physical pages are a data moving unit. A number of the specific physical pages is equal to or greater than two, and is less than a number of physical pages included in each of the physical blocks of the non-volatile memory chip.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other objects, features and advantages of the invention comprehensible, preferred embodiments accompanied with figures are described in detail below. However, the above general descriptions and the following embodiments are only for exemplification and illustration and cannot limit the scope that is claimed by the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
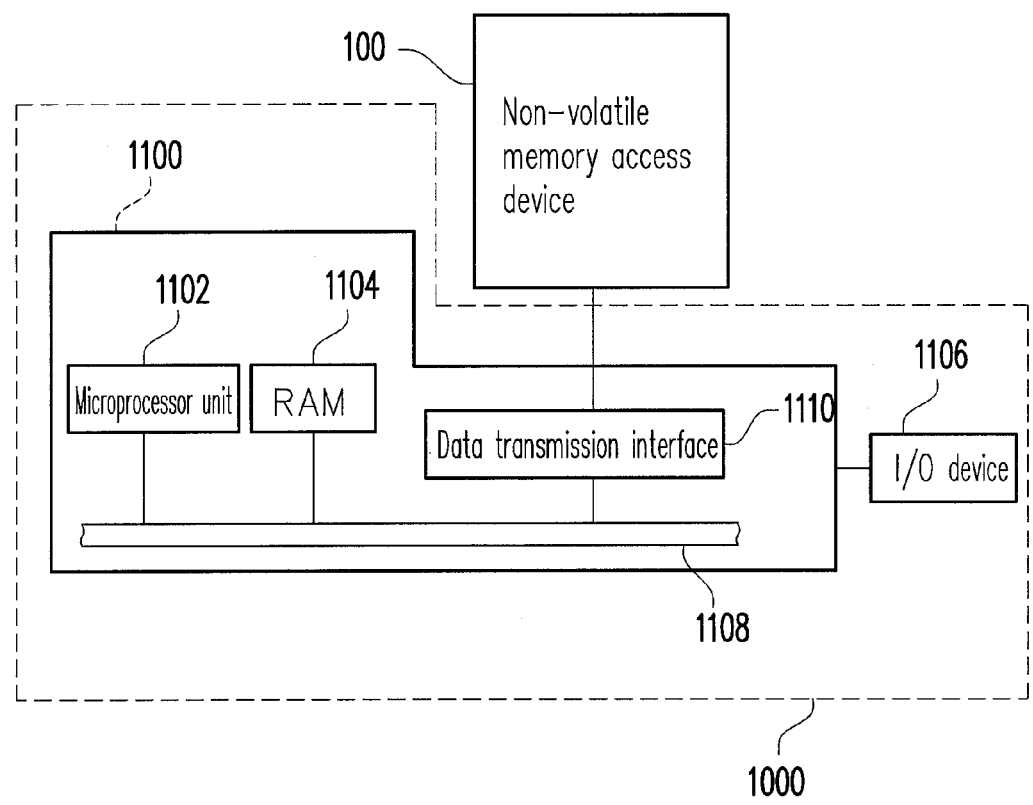
FIG. 1A is a schematic diagram showing a host system which uses a non-volatile memory access device according to an exemplary embodiment of the present invention.

The following refers to the embodiments of the invention in detail and describes implementations of the embodiments in the accompanying drawings. In addition, if possible, the elements in the drawings and in the embodiments which have the same reference numerals represent the same or similar parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1A is a schematic diagram showing a host system which uses a non-volatile memory access device according to an exemplary embodiment of the present invention. The non-volatile memory access device may also be called a non-volatile memory access system.

Please refer to FIG. 1A. A host system 1000 includes a computer 1100 and an input/output (I/O) device 1106.

Figure 1B:
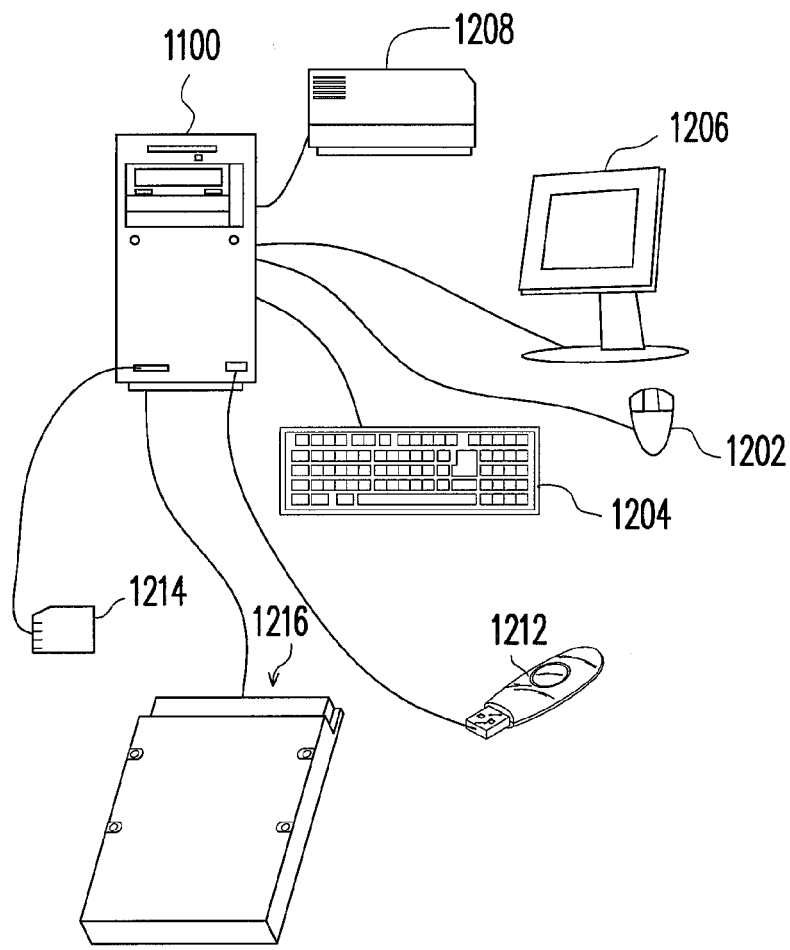
FIG. 1B is a schematic diagram showing a computer, an input/output device, and a non-volatile memory access device according to an exemplary embodiment of the present invention.

The computer 1100 includes a microprocessor unit 1102, a random access memory (RAM) 1104, a system bus 1108, and a data transmission interface 1110. The I/O device 1106 includes a mouse 1202, a keyboard 1204, a display 1206, and a printer 1208 as shown in FIG. 1B. It should be noted that the device in FIG. 1B does not limit the I/O device 1106; the I/O device 1106 may include other devices.

According to an exemplary embodiment of the present invention, a non-volatile memory access device 100 is coupled to other elements of the host system 1000 through the data transmission interface 1110. Through processing of the microprocessor unit 1102, the RAM 1104, and the I/O device 1106, the host system 1000 writes data to the non-volatile memory access device 100, or reads data from the non-volatile memory access device 100. For example, the non-volatile memory access device 100 may be a memory card 1214, a flash drive 1212, or a solid state drive 1216 in FIG. 1B.

Figure 1C:
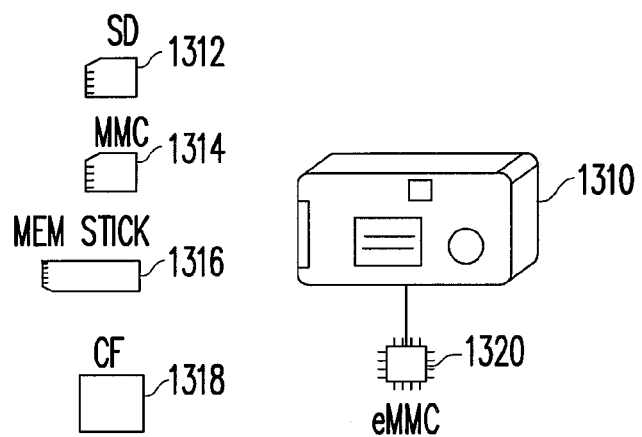
FIG. 1C is a schematic diagram showing a host system and a non-volatile memory access device according to another exemplary embodiment of the present invention.

The host system 1000 is any system that is capable of storing data. Although according to the present exemplary embodiment, the host system 1000 is described as a computer system, according to another exemplary embodiment of the present invention, the host system 1000 may also be a system such as a digital camera, a camcorder, a communication device, an audio player, or a video player. For example, when the host system is a digital camera 1310, the non-volatile memory access device is a secure digital (SD) card 1312, a multimedia card (MMC) 1314, a memory stick 1316, a compact flash (CF) card 1318, or an embedded storage device 1320 used by the digital camera 1310 (as shown in FIG. 1C). The embedded storage device 1320 includes an embedded multimedia card (eMMC). It should be noted that the eMMC is directly coupled to the substrate of the host system.

Figure 2:
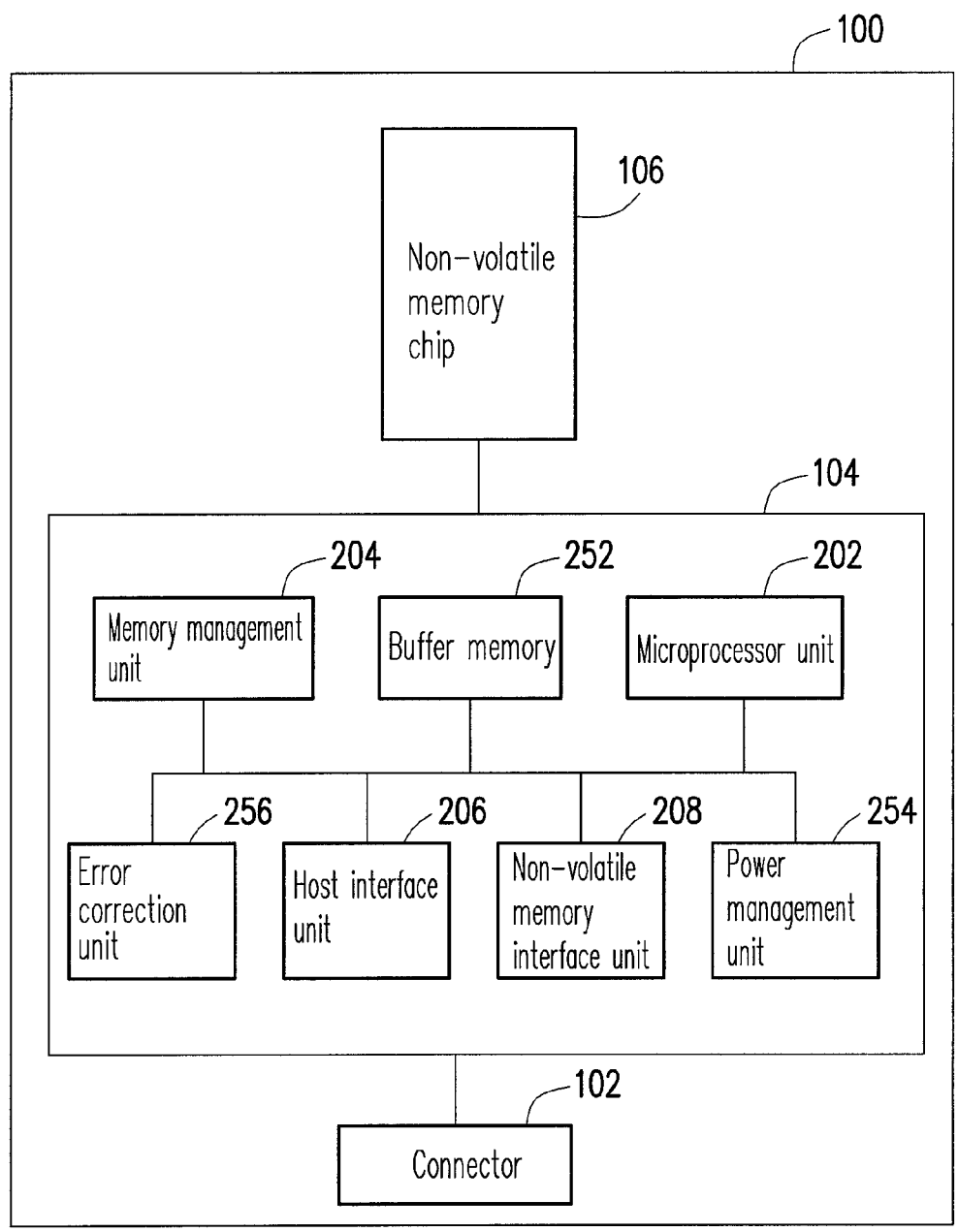
FIG. 2 is a schematic block diagram showing the non-volatile memory access device in FIG. 1A.

FIG. 2 is a schematic block diagram showing the non-volatile memory access device in FIG. 1A. Please refer to FIG. 2, the non-volatile memory access device 100 includes a connector 102, a non-volatile memory controller 104, and a non-volatile memory chip 106.

The connector 102 is coupled to the non-volatile memory controller 104 and is used to be coupled to the host system 1000. According to the present exemplary embodiment, the type of transmission interface supported by the connector 102 is the SD interface. According to other exemplary embodiments, however, the type of transmission interface may be the MMC interface, the serial advanced technology attachment (SATA) interface, the parallel advanced technology attachment (PATA) interface, the institute of electrical and electronic engineers (IEEE) 1394 interface, the peripheral component interconnect (PCI) Express interface, the universal serial bus (USB) interface, the MS interface, the CF interface, the integrated drive electronics (IDE) interface, or any suitable interface which is not limited to the above selection.

The non-volatile memory controller 104 executes a plurality of logic gates or control commands implemented as hardware or firmware, and performs operations such as writing, reading, and erasing of data in the non-volatile memory chip 106 according to commands from the host system 1000.

According to the present exemplary embodiment, the non-volatile memory chip 106 is a flash memory chip. The flash memory chip has a plurality of physical blocks, and each of the physical blocks has a plurality of physical pages. The non-volatile memory chip 106 is used to store a file system information such as a file allocation table (FAT) and to store general data such as multimedia files and text files. According to the present exemplary embodiment, the non-volatile memory chip 106 is a multi level cell (MLC) NAND flash memory chip. The invention, however, it not limited to the above; the non-volatile memory chip 106 may also be a single level cell (SLC) NAND flash memory chip.

In detail, in current NAND flash memory technology, NAND flash memories may be classified, according to the number of bits that are stored in each memory cell, into SLC NAND flash memory chips and MLC NAND flash memory chips. When programming memory cells of an SLC NAND flash memory chip, only single phase programming may be performed, so that each memory cell is capable of storing one bit of data. On the other hand, programming memory cells of an MLC NAND flash memory chip may be divided into multiple phases. For example, for a two level memory cell, programming memory cells may be divided into two phases. The first phase is programming of a lower page which has physical characteristics similar to those of an SLC NAND flash memory chip, and programming of an upper page only begins after finishing the first phase. The program speed of the lower page is faster than the program speed of the upper page. Therefore, the physical pages of each physical block may be classified into slow physical pages (i.e. the upper pages) and fast physical pages (i.e. the lower pages).

Similarly, in cases of eight level memory cells or sixteen level memory cells, the memory cells includes more physical pages and are written in more phases. Here the physical pages which is written the fastest is called the lower page, and all the other physical pages which are written slower are generically called the upper pages. In other words, the upper pages include a plurality of pages which have different write speeds. According to other exemplary embodiments, the upper page may be the physical page with the slowest write speed, or the upper pages may be the physical page with the slowest write speed and some of the physical pages with write speeds faster than the slowest write speed. For example, in the four level memory cells, the lower pages are the physical pages with the fastest and second fastest write speeds, and the upper pages are the physical pages with the slowest and second slowest write speeds.

According to the present exemplary embodiment, the non-volatile memory controller 104 includes a microprocessor unit 202, a memory management unit 204, a host interface unit 206, and a non-volatile memory interface unit 208.

The microprocessor unit 202 is the main controlling unit of the non-volatile memory controller 104 and is used to work cooperatively with the memory management unit 204, the host interface unit 206, and the non-volatile memory interface unit 208, so as to perform various operations of the non-volatile memory access device 100.

The memory management unit 204 is coupled to the microprocessor unit 202 and is used to execute a non-volatile memory access mechanism. According to the present exemplary embodiment, the memory management unit 204 may be implemented in the non-volatile memory controller 104 as a firmware. For example, the memory management unit 204 which includes a plurality of control commands is burned into a program memory (such as a read only memory, ROM), and the program memory is embedded in the non-volatile memory controller 104. When the non-volatile memory access device 100 operates, the microprocessor unit 202 executes a plurality of control commands of the memory management unit 204, so as to execute a non-volatile memory access mechanism. The detailed operations of the memory management unit 204 are elaborated below in conjunction with the drawings.

The host interface unit 206 is coupled to the microprocessor unit 202 and is also coupled to the host system 1000. The host interface unit 206 is used to receive and recognize the commands and data transmitted from the host system 1000. In other words, the commands and data transmitted from the host system 1000 are transmitted to the microprocessor unit 202 via the host interface unit 206. According to the present exemplary embodiment, the host interface unit 206 is complied with the SD interface. According to other exemplary embodiments, the host interface unit 206 may also be complied with the MMC interface, the SATA interface, the PATA interface, the IEEE 1394 interface, the PCI Express interface, the USB interface, the MS interface, the CF interface, the IDE interface, or other standardized interfaces.

The non-volatile memory interface unit 208 is coupled to the microprocessor unit 202, and is used to couple the non-volatile memory controller 104 to the non-volatile memory chip 106, so that the non-volatile memory controller 104 performs relevant operations to the non-volatile memory chip 106. In other words, the data to be written to the non-volatile memory chip 106 are converted, by the non-volatile memory interface unit 208, to a format that is acceptable by the non-volatile memory chip 106.

According to another exemplary embodiment, the non-volatile memory controller 104 further includes a buffer memory 252, a power management unit 254, and an error correction unit 256.

The buffer memory 252 is coupled to the microprocessor unit 202, and is used to temporarily store the data and commands from the host system 1000, or is used to temporarily store the data from the non-volatile memory chip 106.

The power management unit 254 is coupled to the microprocessor unit 202 and is used to control the power for the non-volatile memory access device 100.

The error correction unit 256 is coupled to the microprocessor unit 202 and is used to execute an error correction procedure, so as to ensure correctness of the data. Specifically, when the memory management unit 204 receives the write command from the host system 1000, the error correction unit 256 generates an error checking and correcting (ECC) code corresponding to the write data corresponding to the write command, and the memory management unit 204 writes the write data and the corresponding ECC code into the non-volatile memory chip 106. Afterwards, when the memory management unit 204 reads data from the non-volatile memory chip 106, the memory management unit 204 also reads the ECC code corresponding to the data. In addition, the error correction unit 256 performs the error correction procedure on the read data according to the ECC code.

According to an exemplary embodiment of the present invention, the non-volatile memory controller 104 includes at least one thread, which are scheduled by a real time operation system (RTOS) unit (not shown) in the non-volatile memory controller 104. In other words, the non-volatile memory access device 100 adopts a multi-threading framework, and the RTOS unit is used to manage and to determine the execution sequence of the threads. It must be particularly noted that in the present invention, the number and execution content of the threads are not limited.

Figure 3:
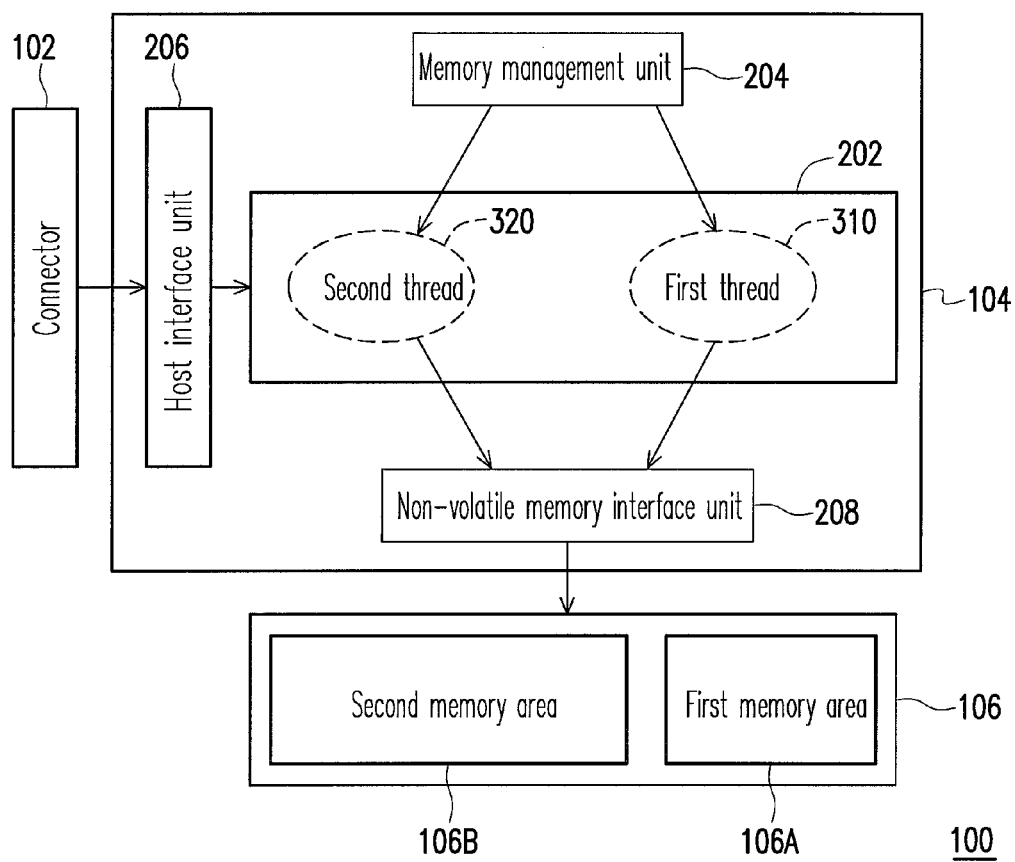
FIG. 3 is a schematic operation diagram showing the non-volatile memory access device in FIG. 1A.

In order to describe easily, here it is assumed that the non-volatile memory controller 104 includes two threads (a first thread 310 and a second thread 320 as shown in FIG. 3). The first thread 310 and the second thread 320 may only access the non-volatile memory chip 106 via the non-volatile memory interface unit 208. If the non-volatile memory access device 100 is a micro SD memory card which has a smart card, the first thread 310 is, for example, a smart card application which is used to execute commands relevant to the smart card, and the second thread 320 is, for example, responsible for receiving commands from the host system 1000 and for reading and writing data from and to the non-volatile memory chip 106. According to the present exemplary embodiment, although both the first thread 310 and the second thread 320 have requirements for accessing the non-volatile memory chip 106, the amount of data accessed by the first thread 310 is less than the amount of data accessed by the second thread 320. It should be noted that after the RTOS unit in the non-volatile memory controller 104 passes the command which the first thread 310 is responsible for to the first thread 310, the non-volatile memory controller 104 may then reply a task completion message to the host system 1000 (the method of replying may be to reply when the host system 1000 inquires, or that the non-volatile memory controller 104 actively sends the message to the host system 1000). This action is to prevent the first thread 310 from spending too much time on analyzing the command content. However, after the RTOS unit passes the command which the second thread 320 is responsible for to the second thread 320, the non-volatile memory controller 104 only sends the task completion message after the second thread 320 actually finishes the task (such as writing data).

According to the present exemplary embodiment, the non-volatile memory chip 106 is divided into at least a first memory area 106A and a second memory area 106B. The first thread 310 is used to access the first memory area 106A and is capable of processing the write command which specifies to write data to the first memory area 106A. The second thread 320 is used to access the second memory area 106B and is capable of processing the write command which specifies to write data to the second memory area 106B. In further detail, the write command relevant to the first memory area 106A is a smart card access command, and the write command relevant to the second memory area 106B is a micro SD memory card access command.

Generally, when the non-volatile memory controller 104 executes a write command given by the host system 1000, merging of two physical blocks is usually required, so as to achieve the purpose of updating data. However, it is clearly defined by the micro SD memory card specification that the completion time for each write command must be equal to or less than 250 milliseconds.

It is assumed that the size of each of the physical pages according to the present exemplary embodiment is four kilobytes, and each of the physical blocks has 128 physical pages. Actual test results show that the time required for merging two physical blocks is about 155.8 milliseconds. Accordingly, assuming that the non-volatile memory controller 104 receives a write command that need to be executed by the first thread 310, and that the write command causes merging of two physical blocks, if the host system 1000 gives another command that need to be executed by the second thread 320 during the period in which the first thread 310 writes data into the non-volatile memory chip 106, the second thread 320 must wait for the first thread to complete the merging of the blocks before the second thread 320 may access the non-volatile memory chip 106. This is due to the fact that both the first thread 310 and the second thread 320 may only access the non-volatile memory chip 106 via the non-volatile memory interface unit 208. If the write command executed by the second thread 320 also causes merging of two physical blocks, the total time for the first thread 310 and the second thread 320 to complete the write command is about 311.6 milliseconds (i.e. 155.8 times two), which exceeds 250 milliseconds as defined by the micro SD memory card specification.

In order to effectively solve such a problem, when the write command given by the host system 1000 is to access a physical block (which is hereafter denoted as a first physical block) in the first memory area 106A of the non-volatile memory chip 106, it means that the write command needs to be executed by the first thread 310. If the write command is to update the data stored in one of a plurality of specific physical pages, the memory management unit 204 first determines whether there is enough space in the first physical block to write the above specific physical pages.

If there is enough space in the first physical block to write the above specific physical pages, the memory management unit 204 instructs the first thread 310 to write the valid data of the above specific physical pages and the data to be updated into the first physical block. However, if the first physical block does not has enough space to write the above specific physical pages, the memory management unit 204 selects an empty physical block (which is hereafter called the second physical block) among the physical blocks included in the first memory area 106A, and instructs the first thread 310 to write the valid data of the above specific physical pages and the data to be updated into the second physical block. It should be noted that when writing the valid data of the above specific physical pages and the data to be updated into the first physical block, the first thread 310 uses some of the fast physical pages and some of the slow physical pages in the first physical block to write the data. Similarly, when writing the valid data of the above specific physical pages and the data to be updated into the second physical block, the first thread 310 uses some of the fast physical pages and some of the slow physical pages in the second physical block to write the data.

Hence it can be known that according to the present exemplary embodiment, the above specific physical pages are defined as a data moving unit. A number of the specific physical pages is equal to or greater than two, and is less than a number of physical pages included in each of the physical blocks of the non-volatile memory chip 106. Here it is assumed that each physical block of the non-volatile memory chip 106 has 128 physical pages, and the data moving unit is, for example, four physical pages (meaning that the number of the specific physical pages is four). The present invention, however, is not limited to the above situation.

Figure 4A:
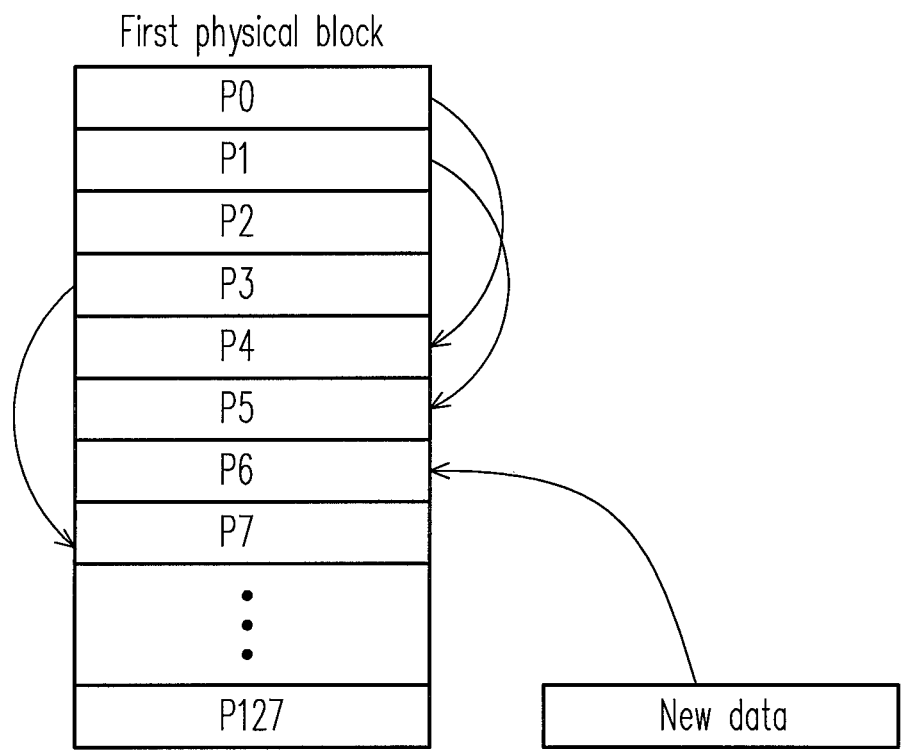
FIGS. 4A and 4B are each a schematic diagram showing data updating according to an exemplary embodiment of the present invention.

Referring to FIG. 4A as an example, if data stored in a specific physical page P2 of four specific physical pages P0 to P3 in the first physical block are to be updated, and all physical pages P4 to P127 in the first physical block do not store data, the memory management unit 204 determines that there is enough space in the first physical block to write data of the four specific physical pages. Accordingly, the memory management unit 204 instructs the first thread 310 to read the data (which are the valid data) stored in the specific physical pages P0, P1, and P3 in the first physical block, and to then write the data that has been read and the new data (which is the data to be updated) to the physical pages P4 to P7 in the first physical block.

Figure 4B:
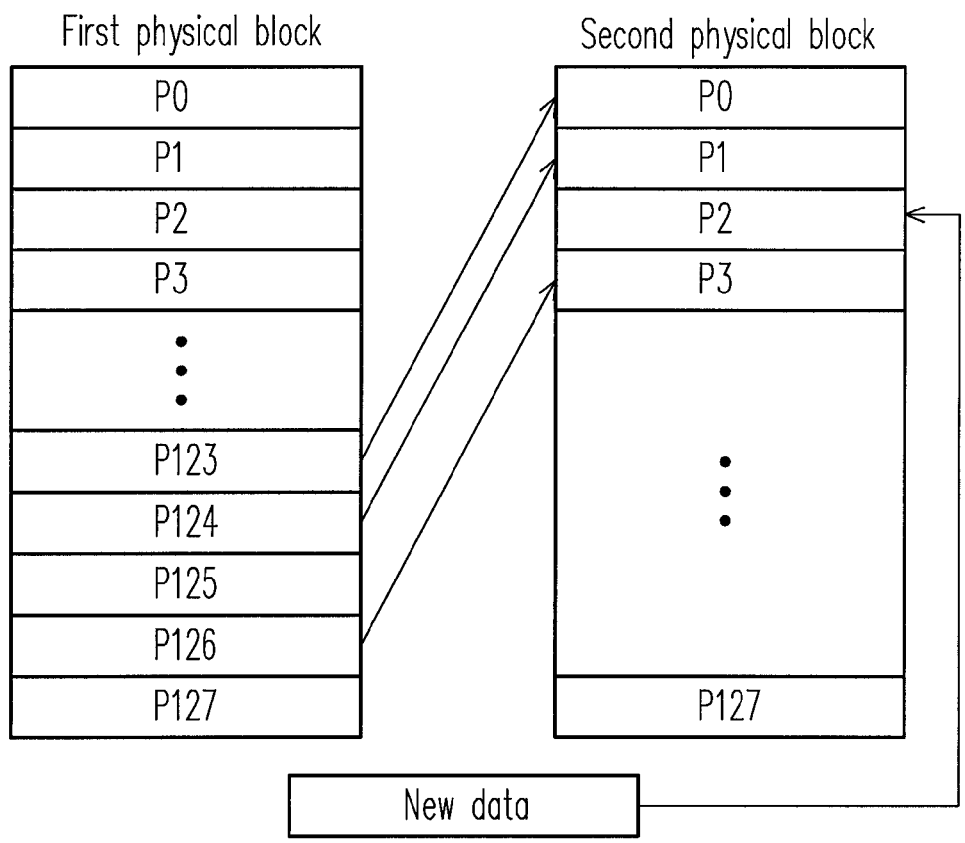

However, as shown in the exemplary embodiment depicted in FIG. 4B, if data stored in the specific physical page P125 among the specific physical pages P123 to P126 in the first physical block are to be updated, and the physical page P127 is the only remaining physical page in the first physical block which does not store data, the memory management unit 204 determines that there is not enough space in the first physical block for writing data of the four specific physical pages. Accordingly, the memory management unit 204 selects an empty second physical block in the first memory area 106A, and instructs the first thread 310 to read the data (which is the valid data) stored in the specific physical pages P123, P124, and P126 in the first physical block, and to then write the read data and the new data to the physical pages P0 to P3 in the second physical block.

In the instant case, the first thread 310 uses four physical pages as a data moving unit. Hence, whenever the data in the first memory area 106A is to be updated, the memory management unit 204 determines whether there is enough memory space in the same physical block to perform updating of the data. If there is not enough memory space, a new physical block is searched for to perform updating of the data. In light of the above, the latest data must be located in the last data moving unit which contains data in the physical block. Since the data that is updated in a physical block only occupies the space of a few physical pages, when the first thread 310 is to update data in the first memory area 106A, there is no occurrence of data merging of two complete blocks. Accordingly, the write speed of the first thread 310 in the first memory area 106A increases.

Figure 5:
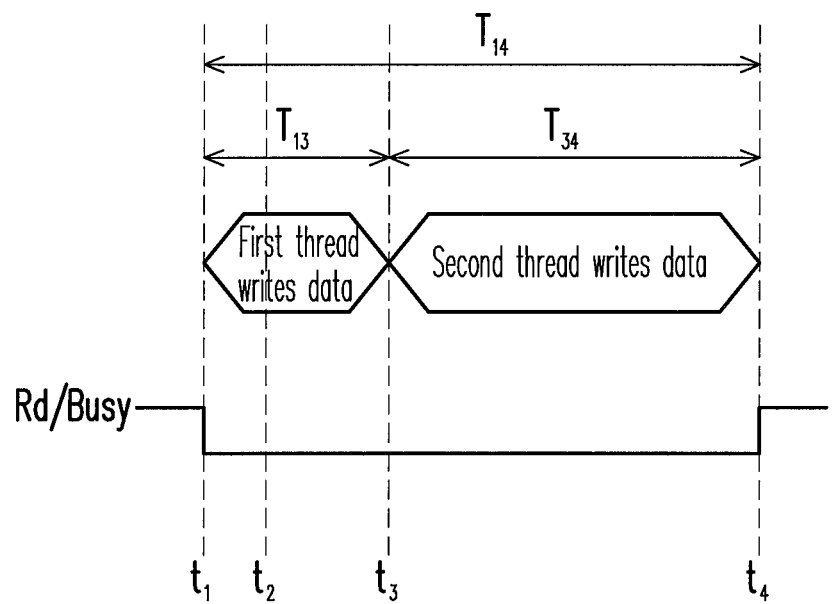
FIG. 5 is a timing diagram showing a first thread and a second thread executing a write command according to an exemplary embodiment of the present invention.

FIG. 5 is a timing diagram which shows that according to an exemplary embodiment of the present invention, during the period in which the first thread 310 writes data into the non-volatile memory chip 106, the host system 1000 gives another write command that needs to be executed by the second thread 320. As shown in FIG. 5, it is assumed that from time point $t_1$ to time point $t_3$, the first thread 310 writes data into the non-volatile memory chip 106 via the non-volatile memory interface unit 208. Since the time needed by the first thread 310 to complete writing is related to the number of physical pages included in the data moving unit, the smaller the number of physical pages included in the data moving unit, the shorter the time that is needed for the first thread 310 to complete writing. For example, if the size of a physical page is four kilobytes and a physical block has 128 physical pages, according to actual test results, the average time needed to read from and write to a physical page is 1.15 milliseconds. If the number of physical pages included in the data moving unit according to the present exemplary embodiment is one, the time $T_{13}$ needed by the first thread 310 to complete writing is 1.15 milliseconds.

If at a time point $t_2$, the non-volatile memory controller 104 receives a write command that requires accessing the second memory area 106B of the non-volatile memory chip 106 (the physical block to be accessed by the write command is called a third physical block), the write command needs to be executed by the second thread 320. The second thread 320 has to wait until the first thread 310 completes writing (i.e. after the time point $t_3$) the data into the non-volatile memory chip 106 via the non-volatile memory interface unit 208. If the write command executed by the second thread 320 is accompanied by merging of physical blocks, the memory management unit 204 selects, according to a general non-volatile memory data access mechanism, an empty physical block in the non-volatile memory chip 106 to be merged with the third physical block, thereby completing updating of the data. According to estimates, under the circumstances in which two physical blocks need to be merged, the actual time $T_{34}$ needed by the second thread 320 to write data is about 155.8 milliseconds. Even if this time is added to the time $T_{13}$ required by the first thread 310 to complete writing, the total time $T_{14}$ (which is 155.8 milliseconds plus 1.15 milliseconds) is still less than the time defined by the micro SD memory card specification (which is 250 milliseconds).

It can be know from the above exemplary embodiments that the management method adopted for the first memory area 106A is to reduce as much as possible the time needed by the first thread 310 to access the first memory area 106A, so that when the first thread 310 accesses the first memory area 106A, not only the size of the data moving unit is limited, but also downward search is performed to determine whether there is enough space in the same physical block to update the data. Hence, no merging of two physical blocks occurs, thereby reducing the time needed by the first thread 310 to access the first memory area 106A.

On the other hand, the management method for the second memory area 106B is to use as effectively as possible the storage space in each of the physical blocks in the second memory area 106B, so that when the second thread 320 accesses the second memory area 106B, a general non-volatile memory management mechanism is executed.

However, the memory management unit 204 adopts the two different management methods to manage the first memory area 106A and the second memory area 106B in the non-volatile memory chip 106, so that even if the second thread 320 receives a command to write data into the second memory area 106B during the period in which the first thread 310 in non-volatile memory controller 104 writes data into the first memory area 106A, it is ensured that the total time needed by the first thread 310 and the second thread 320 to sequentially write data into the non-volatile memory chip is less than the time to complete a write command as defined by the micro SD memory card specification.

Figure 6:
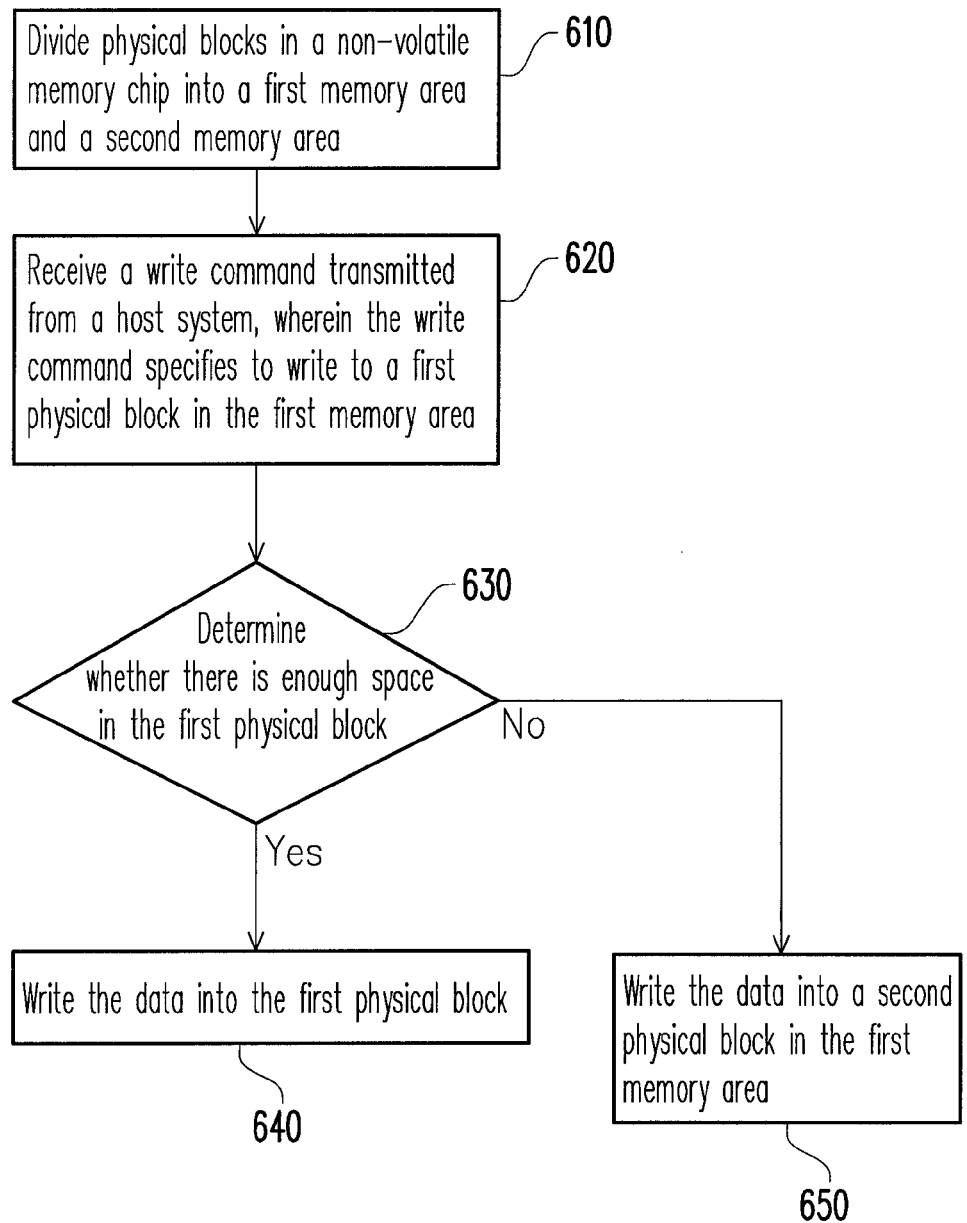
FIG. 6 is a schematic flowchart showing a non-volatile memory access method according to an exemplary embodiment of the present invention.

FIG. 6 is a schematic flowchart showing a non-volatile memory access method according to an exemplary embodiment of the present invention.

Please refer to FIG. 6. The non-volatile memory access method according to the present exemplary embodiment is used to manage the plurality of physical blocks in the non-volatile memory chip 106. Each of the physical blocks includes a plurality of physical pages. The non-volatile memory access device 100 according to the present exemplary embodiment adopts a multi-threading framework, meaning that the non-volatile memory controller includes the RTOS unit and a plurality of threads (such as the first thread 310 and the second thread 320), and the threads are scheduled and managed by the RTOS unit. Moreover, the first thread 310 and the second thread 320 are capable of accessing the non-volatile memory chip 106 via the non-volatile memory interface unit 208.

As shown in a step 610, the physical blocks in the non-volatile memory chip 106 are divided into the first memory area 106A and the second memory area 106B. The first thread 310 accesses the first memory area 106A, and the second thread 320 accesses the second memory area 106B.

Next, in a step 620, the write command transmitted from the host system 1000 is received, wherein the write command specifies writing to one of the physical blocks in the first memory area 106A (which is hereafter called the first physical block), so that the first thread 310 is needed to execute this command. It is assumed that the write command specifies to update data stored in one of the plurality of specific physical pages in the first physical block.

Next, as shown in a step 630, the memory management unit 204 in the non-volatile memory controller 104 is used to determine whether there is enough space in the first physical block to write the above specific physical pages.

When there is enough space in the first physical block to write the above specific physical pages, as shown in a step 640, the valid data of the above specific physical page and the data to be updated are written into the first physical block, so as to complete updating the data. When there is not enough space in the first physical block to write the above specific physical page, as shown in a step 650, a second physical block which is also located in the first memory area 106A and which is empty is selected, so that the valid data of the above specific physical page and the data to be updated are written into the second physical block, so as to complete updating the data.

As shown in each of the steps in FIG. 6, the first thread 310 uses n specific physical pages as a data moving unit, n is equal to or greater than two and is also less than the number of physical pages included in each of the physical blocks of the non-volatile memory chip 106. Under the condition in which the first thread 310 writes data according to the method shown in FIG. 6, even if the host system 1000 transmits another write command that needs to be executed by the second thread 320 (such as to write data into one of the physical blocks in the second memory area 106B) during the period which the first thread 310 writes data to the non-volatile memory chip 106, the first thread 310 does not cause merging of two physical blocks because the number of physical pages included in a data moving unit is less than the number of physical pages included in a physical block. Hence, if the number of the physical pages included in a data moving unit is lowered to a certain degree, no matter whether the write command which the second thread 320 is responsible for requires merging of physical blocks, the total time needed by the first thread 310 and the second thread 320 to complete the write command does not exceed the specified time limit.

According to another exemplary embodiment, in the first memory area 106A accessible by the first thread 310, each of the physical blocks that is included only uses a predetermined number of physical pages to write data. The predetermined number is less than the number of physical pages included in each of the physical blocks of the non-volatile memory chip 106, and the predetermined number of physical pages is at least two physical pages, which include the fast physical pages and the slow physical pages. For example, the predetermined number of physical pages may be two fast physical pages and two slow physical pages. The invention, however, is not limited to the above.

The predetermined number is determined according to the following perimeters: the specified time limit (which is 250 milliseconds) to complete a write command defined by the micro SD memory card specification, the average time needed to merge two physical blocks, and the average time to read from and write into a physical page. For example, an upper limit of a predetermined number $P_{num}$ is calculated through the following equation.

$$P_{num} = \left\lfloor \frac{WCMD_{time} - Merge_{time}}{ONEPAGE_{RW}} \right\rfloor$$

$WCMD_{time}$ is the specified time limit defined by the specification, $Merge_{time}$ is the average time needed to merge two physical blocks, and $ONEPAGE_{RW}$ is the average time needed to read from and write into a physical page. Assuming that the size of each of the physical pages in the non-volatile memory chip 106 is four kilobytes, and each of the physical blocks has 128 physical pages, it is estimated that the average time $Merge_{time}$ needed for merging two physical blocks is 155.8 milliseconds, and the average time needed to read from and write into a physical page is 1.15 milliseconds. By calculation using the above formula, the upper limit of the predetermined number $P_{num}$ is 81. In other words, each of the physical blocks in the first memory area 106A may only use at most 81 physical pages for writing data.

Accordingly, when the non-volatile memory controller 104 receives a write command that needs to be executed by the first thread 310, if the write command specifies to write data into the one of the physical blocks (which is hereafter called the first physical block), the memory management unit 204 in the non-volatile memory controller 104 first determines whether the predetermined number of physical pages in the first physical block have been fully written.

If the predetermined number of physical pages in the first physical block have been fully written, the memory management unit 204 selects a physical block (which is hereafter called the second physical block) in the first memory area 106A for the first thread 310 to write data. It should be noted that if the predetermined number of physical pages in the first physical block have been fully written, there are some physical pages in the first physical block that have not been written data. When the first thread 310 writes data into the second physical block, some of the fast physical pages and some of the slow physical pages in the second physical block are used to write data.

However, if the predetermined number of physical pages in the first physical block have not been fully written, the memory management unit 204 determines whether there is enough space in the predetermined number of physical pages to write data. If yes, the first thread 310 writes data into the first physical block. In other words, data is written to portions of the predetermined number of physical pages where no data has been written. If there is not enough space in the predetermined number of physical pages, the memory management unit 204 selects another physical block (such as the second physical block) among the physical blocks included in the first memory area 106A, so that the first thread 310 writes data into the second physical block.

According to the present exemplary embodiment, when the host system 1000 gives a write command that needs to be executed by the first thread 310, the memory management unit 204 prevents situations in which two physical blocks are merged by specifying that only the predetermined number of physical pages are capable being used to write data. Accordingly, if during the period in which the first thread 310 executes the write command, the host system 1000 gives a write command that needs to be executed by the second thread 320, even if the write command which needs to be executed by the second thread 320 causes merging of two physical blocks, the total time needed by the first thread 310 and the second thread 320 to complete the write command does not exceed the time limit for completing a write command as defined by the micro SD memory card specification.

Figure 7:
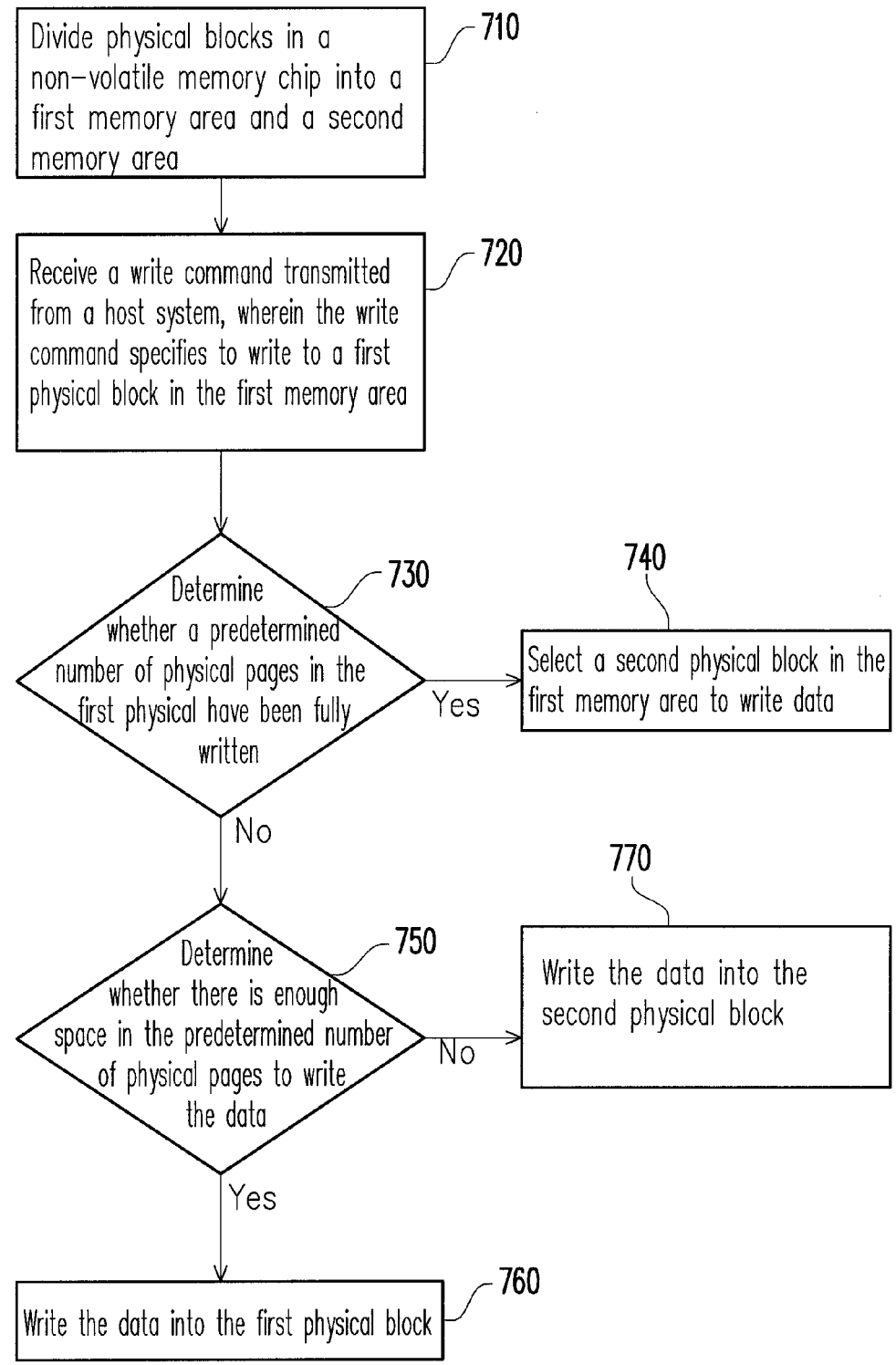
FIG. 7 is a schematic flowchart showing a non-volatile memory access method according to another exemplary embodiment of the present invention.

FIG. 7 is a schematic flowchart showing a non-volatile memory access method according to the above exemplary embodiment. Please refer to FIG. 7. First, as shown in a step 710, the physical blocks included in the non-volatile memory chip 106 are divided into the first memory area 106A which is accessible by the first thread 310 and the second memory area 106B which is accessible by the second thread 320.

Next, in a step 720, the write command transmitted from the host system 1000 is received, wherein the write command specifies writing to the first physical block in the first memory area 106A.

As shown in a step 730, the memory management unit 204 determines whether the predetermined number of physical pages in the first physical block are fully written. If the predetermined number of physical pages have been fully written, as shown in a step 740, the memory management unit 204 selects the second physical block in the first memory area 106A to enable the first thread 310 to write data.

If the predetermined number of physical pages in the first physical block have not been fully written, in a step 750, the memory management unit 204 determines whether there is enough space in the predetermined number of physical pages to write data. If there is enough space, as shown in a step 760, the first thread 310 writes data into the first physical block. If there is not enough space, as shown in a step 770, the first thread 310 writes data into the second physical block.

Through the above method, the memory management unit 204 prevents the first thread 310 from causing merging of two physical blocks when the first physical thread 310 executes the write command, thereby reducing the time spent by the second thread 320 waiting for the first thread 310. Hence, it is ensured that the time for completing a write command does not exceed the time limit defined by the micro SD memory card specification.

The previously described exemplary embodiments of the present invention have many advantages, including ensuring the total time needed by two threads to sequentially write data to the non-volatile memory chip is less than the time limit for completing each write command as defined by the micro SD memory card specification, wherein the advantages aforementioned not required in all versions of the invention.

What are describe above are only embodiments of the invention and do not limit the scope of the invention. Simple and equivalent variations and modifications according to the claims and specification of the invention are still with the scope of the claimed invention.

In addition, each of the embodiments and claims does not have to achieve all the advantages or characteristics which are disclosed in the invention. Moreover, the abstract and title are only used to facilitate searching of patent documents and are not intended in any way to limit the scope of the claimed invention.

What is claimed is:

1. A non-volatile memory access method for accessing a plurality of physical blocks in a non-volatile memory chip, wherein each of the physical blocks has a plurality of physical pages, the non-volatile memory access method comprises:
    receiving an updated data for updating data stored in a first physical block, wherein the first physical block includes a plurality of specific physical pages, the specific physical pages includes a first physical page and a plurality of second physical pages, the data is stored in the first physical page and the second physical pages store valid data;
    determining whether there is enough space in the first physical block for writing the updated data and the valid data therein, wherein the updated data and the valid data are different; and
    if there is enough space in the first physical block for writing the updated data and the valid data therein, writing the updated data into a third physical page of the first physical block and directly copying the valid data from the second physical pages into a plurality of fourth physical pages of the first physical block.

2. The non-volatile memory access method as claimed in claim 1, further comprising:
    if the first physical block has usable space which is not enough for writing the updated data and the valid data therein, selecting an empty second physical block among the physical blocks;
    writing the valid data copied from the first physical block into the second physical block; and
    writing the updated data into the second physical block.

3. The non-volatile memory access method as claimed in claim 2, wherein the physical pages comprise a plurality of fast physical pages, the non-volatile memory access method further comprising:
    writing the valid data and the updated data into the plurality of the fast physical pages.

4. The non-volatile memory access method as claimed in claim 2, further comprising:
    dividing the physical blocks into a first memory area and a second memory area, wherein the first physical block and the second physical block belong to the first memory area.

5. The non-volatile memory access method as claimed in claim 4, further comprising:
    making a total time of writing the updated data and the valid data and then moving the data stored in all the physical pages of a third physical block to a fourth physical block equal to or less than a specified time limit, wherein the third physical block and the fourth physical block belong to the second memory area.

6. The non-volatile memory access method as claimed in claim 5, wherein the specified time limit is defined by a specification.

7. The non-volatile memory access method as claimed in claim 1, wherein the specific physical pages are a data moving unit, and a number of the specific physical pages is equal to or greater than two, and is less than a number of physical pages comprised in each of the physical blocks of the non-volatile memory chip.

8. A non-volatile memory controller, disposed in a non-volatile memory access device which comprises a non-volatile memory chip, wherein the non-volatile memory chip comprises a plurality of physical blocks, and each of the physical blocks has a plurality of physical pages, the non-volatile memory controller comprises:
- a microprocessor unit;
- a non-volatile memory interface unit, coupled to the microprocessor unit, for coupling to the non-volatile memory chip;
- a host interface unit, coupled to the microprocessor unit, for coupling to a host system; and
- a memory management unit, coupled to the microprocessor unit,
- wherein, if the memory management unit receives an updated data for updating data stored in a first physical block, the memory management unit determines whether there is enough space in the first physical block for writing the updated data and the valid data therein, wherein the updated data and the valid data are different;
- wherein, the first physical block includes a first physical page and a plurality of second physical pages, the data is stored in the first physical page and the valid data is stored in the second physical pages;
- if there is enough space in the first physical block for writing the updated data and the valid data therein, the memory management unit writes the updated data into a third physical page of the first physical block, and the memory management unit directly copies the valid data from the second physical pages into a plurality of fourth physical pages of the first physical block.

9. The non-volatile memory controller as claimed in claim 8, wherein if the first physical block has usable space which is not enough for writing the updated data and the valid data therein, the memory management unit selects an empty second physical block among the physical blocks for writing the valid data copied from the first physical block and the updated data therein.

10. The non-volatile memory controller as claimed in claim 9, wherein the physical pages comprise a plurality of fast physical pages, and the memory management unit writes the valid data and the updated data into the fast physical pages in the first physical block or in the second physical block.

11. The non-volatile memory controller as claimed in claim 9, wherein the physical blocks are divided into a first memory area and a second memory area, and the first physical block and the second physical block belong to the first memory area.

12. The non-volatile memory controller as claimed in claim 11, wherein the memory management unit makes a total time of writing the updated data and the valid data into the first physical block and then moving the data stored in all the physical pages of a third physical block to a fourth physical block equal to or less than a specified time limit, wherein the third physical block and the fourth physical block belong to the second memory area.

13. The non-volatile memory controller as claimed in claim 8, wherein the specific physical pages are a data moving unit, and a number of the specific physical pages is equal to or greater than two, and is less than a number of the physical pages comprised in each of the physical blocks of the non-volatile memory chip.

14. A non-volatile memory access system, comprising:
- a non-volatile memory chip, having a plurality of physical blocks, wherein each of the physical blocks has a plurality of physical pages;
- a connector, coupled to a host system; and
- a non-volatile memory controller, coupled to the non-volatile memory chip and the connector,
- wherein, if the memory controller receives an updated data for updating data stored in a first physical block, the non-volatile memory controller determines whether there is enough space in the first physical block for writing the updated data and the valid data therein, wherein the updated data and the valid data are different;
- wherein, the first physical block includes a first physical page and a plurality of second physical pages, the data is stored in the first physical page and the valid data is stored in the second physical pages;
- if there is enough space in the first physical block for writing the updated data and the valid data therein, the memory controller writes the updated data into a third physical page of the first physical block, and the memory controller directly copies the valid data from the second physical pages into a plurality of fourth physical pages of the first physical block.

15. The non-volatile memory access system as claimed in claim 14, wherein if the first physical block has usable space which is not enough for writing the updated data and the valid data therein, the non-volatile memory controller selects an empty second physical block among the physical blocks for writing the valid data and the updated data therein.

16. The non-volatile memory access system as claimed in claim 15, wherein the physical pages comprise a plurality of fast physical pages and a plurality of slow physical pages;
- wherein, the valid data and the updated data are written into the fast physical pages in the first physical block or in the second physical block.

17. The non-volatile memory access system as claimed in claim 15, wherein the physical blocks are divided into a first memory area and a second memory area, and the first physical block and the second physical block belong to the first memory area.

18. The non-volatile memory access system as claimed in claim 17, wherein the non-volatile memory controller makes a total time of writing the updated data and the valid data into the first physical block, and then moving the data stored in all the physical pages of a third physical block to a fourth physical block equal to or less than a specified time limit, wherein the third physical block and the fourth physical block belong to the second memory area.

19. The non-volatile memory access system as claimed in claim 14, wherein the specific physical pages are a data moving unit, and a number of the specific physical pages is equal to or greater than two, and is less than a number of physical pages comprised in each of the physical blocks of the non-volatile memory chip.

* * * * *